United States Patent [19]
Bringol

[11] 3,826,965
[45] July 30, 1974

[54] CONSTANT TANGENTIAL VELOCITY MOTOR CONTROL FOR A DISC RECORDING SYSTEM

[75] Inventor: Charles Ronald Bringol, Austin, Tex.

[73] Assignee: International Business Machines Corporation, Armonk, N.Y.

[22] Filed: Nov. 29, 1972

[21] Appl. No.: 310,502

[52] U.S. Cl. .................................. 318/39, 318/578
[51] Int. Cl. .............................................. H02p 7/68
[58] Field of Search .............................. 318/39, 578

[56] References Cited
UNITED STATES PATENTS

| | | | |
|---|---|---|---|
| 2,600,988 | 6/1952 | Greene et al. | 318/39 UX |
| 2,809,333 | 10/1957 | Wagner | 318/39 |
| 3,090,266 | 5/1963 | Wagner | 318/39 X |

*Primary Examiner*—T. E. Lynch
*Attorney, Agent, or Firm*—Douglas H. Lefeve

[57] ABSTRACT

A disc recording system includes a motor control system for energizing a DC motor utilized as the prime mover of a recording disc. A transducer attached to a carrier, movable along a radius of the disc, is utilized for reading data from the disc or recording data onto the disc. A linear potentiometer is fixedly mounted along a radius of the disc and includes a movable wiper connected for movement with the transducer carrier. The potentiometer is connected in the feedback loop of a high gain amplifier function generator which produces an output voltage that is hyperbolic with respect to the position of the wiper along the length of the linear potentiometer. This hyperbolic output voltage is applied to a DC motor for providing substantially constant tangential velocity of the portion of the disc adjacent to the transducer. In applications wherein the transducer mechanically contacts the disc, increased torque opposes motor rotation as the transducer is moved farther away from the center of the disc. In these applications, a compensating motor driver is inserted between the hyperbolic function generator and the motor to provide an increase in electrical energy supplied to the motor in response to increased torque in opposition to motor rotation.

6 Claims, 4 Drawing Figures

CONSTANT TANGENTIAL VELOCITY MOTOR CONTROL FOR A DISC RECORDING SYSTEM

BACKGROUND OF THE INVENTION

1. Field of the Invention

This invention relates to disc recording systems in general, and more particularly to a disc recording system having a DC motor driven disc, such that a constant tangential velocity with respect to a transducer moving radially along the disc is presented.

2. Description of the Prior Art

Dictation systems in which data is spirally recorded on a magnetic disc media are known in the art. Various approaches have been heretofore proposed for recording increased amounts of dictated material onto smaller magnetic discs while maintaining acceptable frequency response characteristics.

If the disc is maintained at a constant angular velocity and the magnetic transducing head is driven radially across the disc with a lead screw having a linear pitch, at a fixed angular velocity of the disc the tangential velocity of the disc with respect to the magnetic head increases as the head is moved radially outward from the center of the disc. This higher tangential velocity produces improved frequency response of the recording; however, if the frequency response is acceptable at the lowest tangential velocity, recording density is lowered by increasing this velocity as the head moves radially outward from the center of the disc.

A proposed solution for the varying tangential velocity problem described above incorporates a linear potentiometer mounted along a radius of the disc and having a wiper mechanically connected to the transducing head and movable along the radius with the transducing head. A reference voltage is applied to one end of the potentiometer and the other end is grounded. The disc driving DC motor is connected between the wiper and ground with the wiper moving radially outward with head movement toward the grounded end of the potentiometer. In this manner, motor drive is decreased as the head nears the outermost portion of the disc. Using this approach, the correct tangential velocity can be accurately set for the inside and outside radii of the recorded portion of the disc; however, a substantial variation in tangential velocity occurs between these end points, provided these end points are appreciably spaced apart. U.S. Pat. No. 3,568,027 to James L. Bacon, et. al., Ser. No. 877,723, filed Nov. 18, 1969, issued Mar. 2, 1971, entitled, "Motor Control Circuit with Symmetrical Topology", suggests that substantially constant tangential velocity may be maintained by utilization of a non-linear potentiometer having a substantially hyperbolic resistance pattern. An obvious disadvantage of this solution is the high cost of an accurate hyperbolic potentiometer.

Another problem encountered in attempting to achieve constant tangential velocity is that increased torque is presented in opposition to motor rotation as the magnetic head moves farther away from the center of the disc. This is because the distance between the head and the center of the disc is a moment arm, and if the head presents an equal force perpendicular to the disc at any portion on this disc, the torque increases as the moment arm increases. A compensating motor driver circuit for increasing motor drive in response to an increase of torque in opposition to motor drive is taught in U.S. Pat. No. 3,568,027, cited above.

It would, therefore, be advantageous to provide a disc recording system including an economical motor control system which achieves substantially constant tangential disc velocity with respect to a radially movable transducing head at any location on the disc. Further, it would be advantageous to include in this motor control system a compensation means for increasing motor drive in response to increased torque in opposition to motor rotation.

SUMMARY OF THE INVENTION

Accordingly, a disc recording system is provided including a motor control system for energizing a DC motor utilized as the prime mover of the recording disc. A transducer attached to a carrier movable along a radius of the disc is utilized for reading information from the disc or recording information onto the disc. A linear potentiometer is fixedly mounted along a radius of the disc and includes a moveable wiper connected for movement with the transducer carrier. The potentiometer is connected in the feedback loop of a high gain amplifier function generator which produces an output voltage that is hyperbolic with respect to the position of the wiper along the length of the linear potentiometer. This hyperbolic output voltage is applied to a DC motor for providing substantially constant tangential velocity of the portion of the disc adjacent to the transducer.

In applications wherein the transducer mechanically contacts the disc, increased torque opposes motor rotation as the transducer is moved farther away from the center of the disc. In these applications, a compensating motor driver is inserted between the hyperbolic function generator and the motor to provide an increase in electrical energy supplied to the motor in response to increased torque in opposition to motor rotation.

Other objects, features, and advantages of the invention will be apparent from the following more particular description of a preferred embodiment of the invention, as illustrated in the accompanying drawings.

DESCRIPTION OF THE PREFERRED EMBODIMENT

Figures 1, 2:
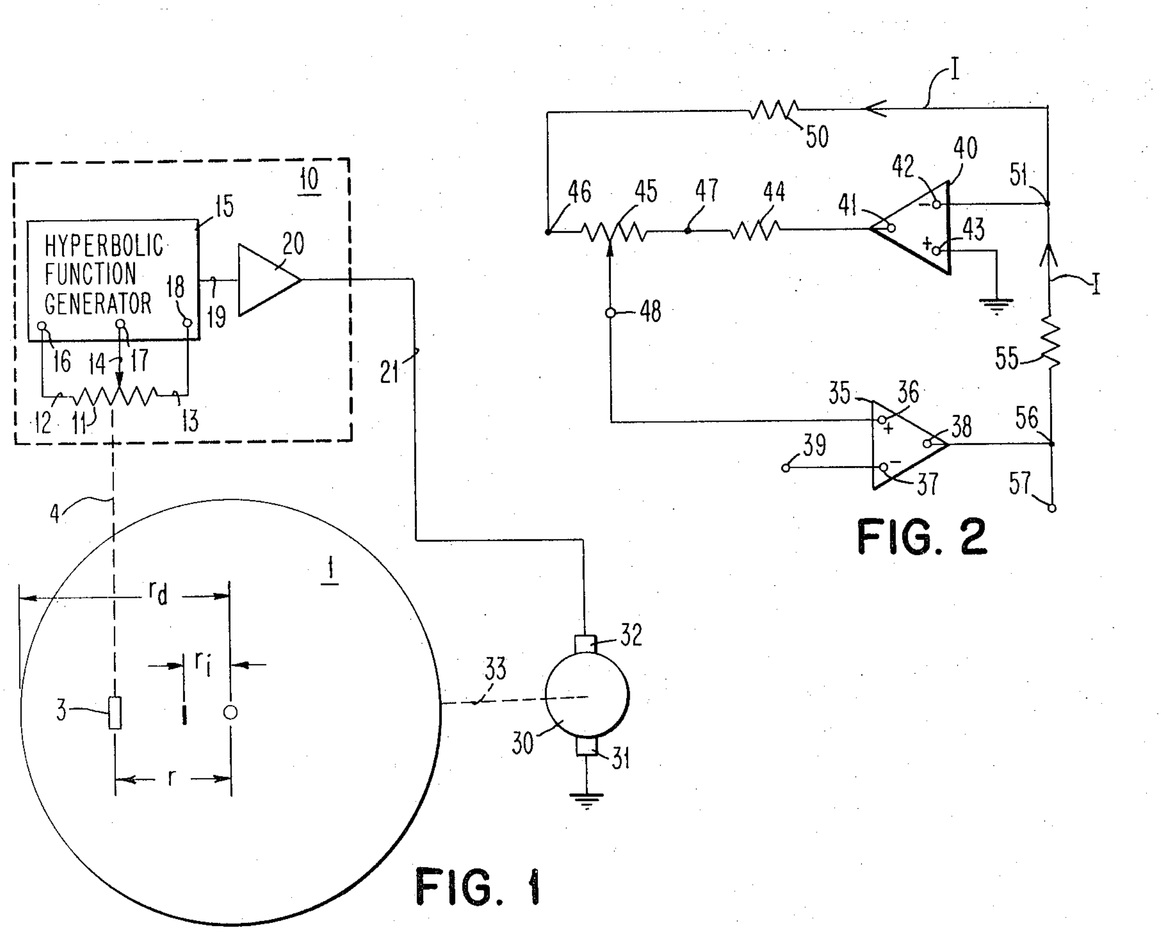
FIG. 1 is a block diagram showing the disc recording system of this invention.
FIGS. 2 and 3 are circuit diagrams of preferred embodiments of the hyperbolic function generator of the motor control system of this invention.

Referring now to FIG. 1, the recording system of this invention is shown. Recording disc 1 is driven by DC motor 30 through transmission 33. Transmission 33 provides a constant speed change factor so that the angular velocity of disc 1 has a fixed, constant relationship to the angular velocity of motor 30. Transmission 33 may, therefore, be a direct drive means or may be a single ratio speed reduction or speed multiplication device.

Transducer 3 is radially movable along disc 1 between the outer ends of radius $r_i$ and radius $r_d$. The radial position of transducer 3 at any time is denoted as $r$.

Motor control system 10 includes linear potentiometer 11, hyperbolic function generator 15, and motor driver 20. Potentiometer 11 has ends 12 and 13 connected to terminals 16 and 18, respectively, of hyperbolic function generator 15. Wiper 14 of potentiometer 11 is connected to terminal 17 of generator 15. Motor driver 20 has an input connected to the output of generator 15 by line 19.

The output of motor driver 20 of motor control system 10 is connected along line 21 to terminal 32 of motor 30. Terminal 31 of motor 30 is grounded.

Potentiometer 11 is mounted parallel to a radius of disc 1 and wiper 14 of potentiometer 11 is mechanically connected to transducer 3, as depicted by dashed line 4. Wiper 14, therefore, is radially movable along potentiometer 11 and follows transducer 3 as it moves along a radius of disc 1.

Assume now that the motor driver circuit of driver 20 is an ideal function. Further assume that motor 30 is electrically driven in a region wherein the angular velocity of motor 30 is directly proportional to the internally generated back EMF of motor 30. Therefore:

$$\omega_m = K_v E_b \quad 1.$$

where:

$\omega_m$ is the angular velocity of motor 30;

$K_v$ is a motor speed constant; and $E_b$ is the internally generated back EMF of motor 30.

Since the motor driver circuit of driver 20 is assumed to be ideal and further assuming the driver 20 has a gain of unity, $E_b = E_f$, where $E_f$ is the motor driving voltage. The relationship of tangential velocity of disc 1 with respect to the radial position of transducer 30 may be expressed as follows:

$$V_t = \omega_d\, r = K_t \omega_m\, r \quad 2.$$

where:

$V_t$ is the tangential velocity of disc 1 with respect to the radial position of transducer 3;

$\omega_d$ is the angular velocity of disc 1;

$r$ is the radial distance of tranducer 3 from the center of disc 1; and $K_t$ is the speed change constant of transmission 33.

Substituting equation (1) into equation (2):

$$V_t = K_t K_v E_b\, r = K_t K_v E_f\, r \quad 3.$$

From an inspection of equation (3), it can be seen that if $E_f$ is proportional to $1/r$, then $V_t$ is constant and independent of $r$. Since $E_f$ times $r$ is constant a hyperbolic relationship is described.

Hyperbolic function generator 15 and linear potentiometer 11 are utilized to produce $E_f$ proportional to $1/r$. A circuit is shown in FIG. 2 utilizing differential amplifiers in a resistive network to produce an output voltage proportional to $1/r$. In FIG. 2, a negative reference voltage is applied to input terminal 39, which is connected to negative input terminal 37 of operational amplifier 35. Positive input terminal 36 of amplifier 35 is connected to wiper 48 of linear potentiometer 45. An end of potentiometer 45 and an end of resistor 44 are connected together at node 47. The opposite end of resistor 44 is connected to output terminal 41 of operational amplifier 40. The opposite end of potentiometer 45 is connected to an end of resistor 50 at node 46. The opposite end of resistor 50 is connected to node 51 which, in turn, is connected to the negative input terminal 42 of operational amplifier 40. Positive input terminal 43 of amplifier 40 is grounded. Resistor 55 is connected between nodes 51 and 56. Node 56 is connected to output terminal 38 of amplifier 35 and to the hyperbolic function generator output terminal 57.

For an analysis of the circuit shown in FIG. 2, assume now that amplifiers 35 and 50 are high gain operational amplifiers operated in a linear region. Operated as such, substantially no potential difference is presented between the input terminals of the amplifiers and, because of their high input impedance characteristics, substantially no current flows into the input terminals of amplifiers 35 and 40. If a negative reference voltage is applied to input terminal 39, a substantially equal negative voltage is present at positive input terminal 36 of amplifier 35 and at wiper 48 of linear potentiometer 45. Since positive input terminal 43 of amplifier 40 is grounded, a virtual ground is present at negative input terminal 42 of amplifier 40. The negative reference voltage, therefore, is dropped across a series resistance including resistor 50 in series with the wiped portion of linear potentiometer 45 between wiper 48 and node 46. The current flowing through resistance 50 is computed as follows:

$$I = E_{ref}/(R_1 + R_{AB}) \quad 4.$$

where:

$I$ is the current flowing in resistor 50;

$E_{ref}$ is the negative reference voltage applied to input terminal 39;

$R_1$ is a resistor 50; and $R_{AB}$ is the wiped portion of linear potentiometer 45 between wiper 48 and node 46.

Since it is assumed that substantially no current enters the input terminals of operational amplifiers 35 and 40, current I flowing from node 51 toward resistor 50 enters node 51 from resistor 55. Since node 51 is at virtual ground, the voltage at node 56 with respect to ground, is given as follows:

$$E_f = I R_3 \quad 5.$$

where:

$E_f$ is the voltage at node 56 and output terminal 57 with respect to ground; and $R_3$ is resistor 55.

Assume now that potentiometer 45 is radially positioned along disc 1 in FIG. 1 with the end of potentiometer 45 connected to node 47 at the outer radius, $r_d$, and the end of potentiometer 45 connected to node 46 at the inner radius, $r_i$. Since potentiometer 45 is linear, $R_{AB}$, in equation (4) may also be expressed as follows:

$$R_{AB} = (r - r_i/L)\, R_L \quad 6.$$

where:

$R_{AB}$ is the wiped resistance of linear potentiometer 45 between wiper 48 and node 46;

$r$ is the radial distance of transducer 3 from the center of disc 1;

$r_i$ is the closest radial distance transducer 3 can travel toward the center of disc 1;

$R_L$ is the total wiped resistance of potentiometer 45 as wiper 48 moves from $r_i$ to $r_d$; and $L$ is the radial distance of travel from $r_i$ to $r_d$.

Substituting equation (6) into equation (4):

$$I = \frac{E_{ref}}{R_1 + \left(\frac{r - r_i}{L}\right) R_L} \qquad (7)$$

and substituting equation (7) into equation (5):

$$E_f = \frac{E_{ref}\, R_3}{R_1 + \left(\frac{r - r_i}{L}\right) R_L} \qquad (8)$$

Substituting equation (8) into equation (3):

$$V_t = \frac{K_t K_v E_{ref}\, R_3}{R_1 + \left(\frac{r - r_i}{L}\right) R_L} \qquad (9)$$

Mathematically differentiating equation (9) with respect to $r$ and letting $\delta V_t/\delta r = 0$;

$$R_1 = (r_i/L)\, R_L \qquad 10.$$

Therefore if the value of $R_1$ (resistor 50) is computed according to equation (10) the tangential velocity of disc 1 with respect to the position of transducer 3 and wiper 48 is constant and may be expressed as follows:

$$V_t = K_A/R_L \qquad 11.$$

where:

$K_A = E_{ref}\, R_3 K_t K_v$

From equation 11 it is seen that $V_t$ is directly proportional to $E_{ref}$. $V_t$ may, therefore, be varied simply by adjusting the $-E_{ref}$ supplied to input terminal 39 of the hyperbolic function generator. Such an adjustment could be made by the addition of another linear potentiometer having one end grounded, the other end connected to $-E_{ref}$, and the wiper connected to terminal 39.

Figure 4:
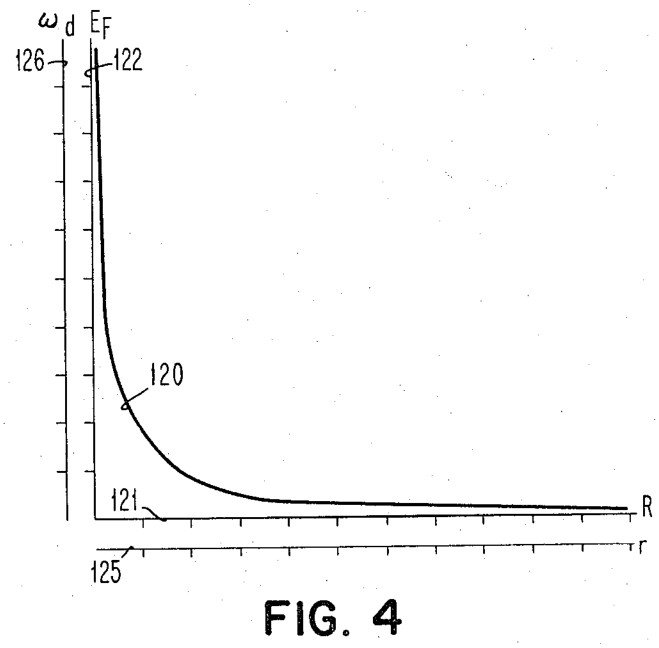
FIG. 4 is a graph showing the hyperbolic relationship between angular velocity and radius of the disc and between motor driving voltage and resistance of the wiped portion of the potentiometer as constant tangential velocity is maintained with respect to wiper position.

Thus, it is seen in FIG. 4, that a plot of $E_f$ on scale 122 versus R on scale 121, yields a hyperbola 120, where R is the total resistance represented by the denominator of equations (7), (8) and (9). Hyperbola 120 is also the result of a plot of $\omega_d$ on scale 126 verses R on scale 125.

Figure 3:
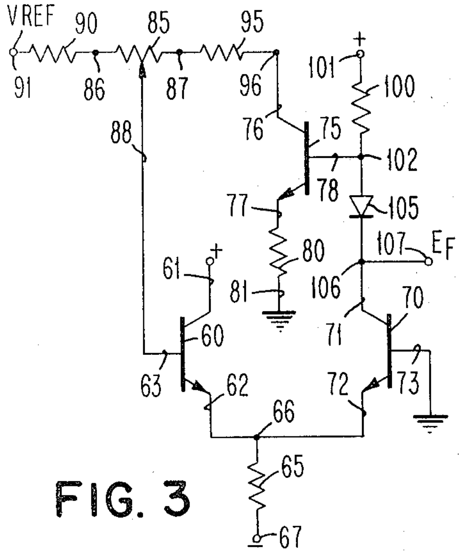

FIG. 3 shows a discrete component embodiment of the hyperbolic function generator circuit of FIG. 2. A reference voltage is applied to terminal 91 of resistor 90. The opposite end of resistor 90 is connected at node 86 to an end of linear potentiometer 85. The opposite end of potentiometer 85 is connected at node 87 to an end of resistor 95. The opposite end of resistor 95 is connected at node 96 to collector 76 of transistor 75. Emitter 77 of transistor 75 is connected through resistor 80 to ground at end 81 of resistor 80. A positive voltage is applied to node 101. Resistor 100 is connected between node 101 and node 102, the latter node being connected to base 78 of transistor 75. Output voltage $E_f$ is present at node 106 and terminal 107. The cathode of diode 105 is connected to node 106, while the anode of diode 105 is connected to node 102.

Transistors 60 and 70 function as a differential amplifier. Base 63 of transistor 60 is connected to wiper 88 of linear potentiometer 85. Base 73 of transistor 70 is grounded. Collector 61 of transistor 60 is connected to a positive voltage, while collector 71 of transistor 70 is connected to node 106. Emitters 62 and 72 of transistors 60 and 70, respectively, are connected together at node 66. Resistor 65 is connected between node 66 and terminal 67 to which is applied a negative voltage.

An analysis of the hyperbolic function generator circuit shown in FIG. 3 is substantially similar to the analysis above with respect to the hyperbolic function generator circuit of FIG. 2. Since the differential amplifier is operated in a linear region, base 63 of transistor 60 is at virtual ground because base 73 of transistor 70 is grounded. Current flowing through resistor 90 and the portion of potentiometer 85 between node 86 and wiper 88 is simply VREF divided by these resistances. Since transistor 75 is conducting, this current also flows through the portion of potentiometer 85 between wiper 88 and node 87, through resistor 95. Substantially the same current flows through resistor 80 to ground. As this current is changed by movement of wiper 88, the voltage between emitter 77 of transistor 75 and ground is changed, since this changing current flows through resistor 80. Diode 105 is selected to balance the voltage drop from base 78 to emitter 77 of transistor 75, so that $E_f$ is equal to the voltage between emitter 77 and ground.

If transducer 3 contacts disc 1 during rotation of disc 1, the drag produced by transducer 3's contact with disc 1 establishes a torque in opposition to rotation of motor 30. This torque is dependent upon $r$, the radial distance from the center of disc 1 to transducer 3. As $r$ increases, opposing torque increases, since $r$ is the moment arm.

In applications where transducer 3 contacts disc 1, motor drive 20 can be employed to provide a compensating increase in motor drive to offset this increased torque loading on the motor. An example of such a motor driver that may be used for motor driver 20 is found in U.S. Pat. No. 3,568,027, cited above and disclosed therein in ample detail to enable anyone having skill in the motor control art to utilize the motor driver described therein in the subject motor control system.

In summary, there has been shown a disc recording system utilizing a motor control system which energizes a DC motor to provide a constant tangential velocity of a portion of the disc adjacent to a radially movable transducer used for writing information onto or reading information from the disc. The motor control system utilizes an inexpensive linear potentiometer fixedly mounted along a radius of the disc. The potentiometer includes a movable wiper connected for movement with the transducer. The potentiometer is connected in the feedback loop of a high gain amplifier function generator which produces an output voltage that is hyperbolic with respect to the position of the wiper along the length of the linear potentiometer. This hyperbolic output voltage is applied to a DC motor for providing constant tangential velocity of the portion of the disc adjacent to the transducer, regardless of the radial position of the transducer. In applications wherein the transducer mechanically contacts the disc, increased torque opposes motor rotation as the transducer is moved farther away from the center of the disc. In these applications a compensating motor driver is inserted between the hyperbolic function generator and the motor to provide an increase in electrical energy supplied to the motor in response to increased torque in opposition to motor rotation.

While the invention has been particularly shown with reference to a preferred embodiment thereof, it will be understood by those skilled in the art that the foregoing and other changes in form and detail may be made therein without departing from the spirit and scope of the invention.

What is claimed is:

1. A recording system comprising:

a recording disc and a transducer radially movable along said disc;

a motor for rotating said disc; and a motor control system connected to said motor for providing substantially constant tangential velocity of a portion of said disc adjacent to said transducer, said motor control system including a hyperbolic function generator having a high gain amplifier, a linear potentiometer having a wiper connected for movement with said transducer and electrically connected to a first input of said amplifier, said amplifier having a second input connected to a reference voltage, said potentiometer having a second terminal connected through a resistance to a substantially constant voltage, and said hyperbolic function generator having a feedback path from an output of said amplifier, through a third terminal of said potentiometer, through said wiper of said potentiometer to said first input of said amplifier.

2. The recording system of claim 1 wherein said motor control system further includes compensation means connected between said hyperbolic function generator and said motor for increasing electrical energy input to said motor in response to an increase of torque in opposition to the rotation of said disc.

3. The recording system of claim 2 wherein said tangential velocity of said portion of said disc adjacent to said transducer is directly proportional to a reference voltage supplied to said hyperbolic function generator of said motor control system.

4. The recording system of claim 3 wherein said linear potentiometer of said motor control system is fixedly mounted substantially parallel to a radius of said disc.

5. The recording system of claim 4 wherein both ends of said linear potentiometer are offset from the center of said disc; and said hyperbolic function generator further includes a resistance in series with the end of said potentiometer in closest proximity to said center of said disc.

6. The recording system of claim 5 wherein said disc is a magnetic recording disc and said transducer is a magnetic transducer for reading information from said disc and for writing said information onto said disc.

* * * * *